March 18, 1958

C. L. BARKER 2,827,238

FLUID MIXING DEVICES

Filed Dec. 16, 1954

March 18, 1958     C. L. BARKER     2,827,238

FLUID MIXING DEVICES

Filed Dec. 16, 1954     4 Sheets-Sheet 2

March 18, 1958 C. L. BARKER 2,827,238
FLUID MIXING DEVICES

Filed Dec. 16, 1954 4 Sheets-Sheet 3

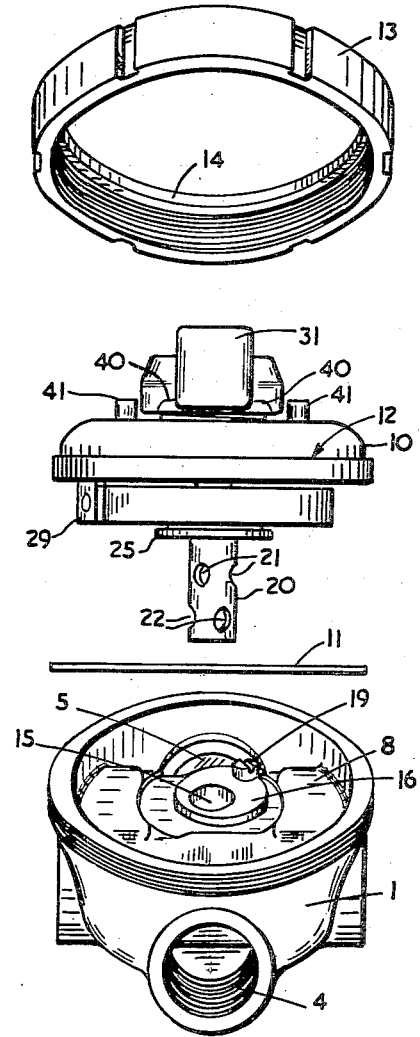

United States Patent Office 2,827,238
Patented Mar. 18, 1958

2,827,238

FLUID MIXING DEVICES

Clifford Lewis Barker, Cheltenham, England, assignor to Walker, Crosweller & Company, Limited, Cheltenham, England Application December 16, 1954, Serial No. 475,608

Claims priority, application Great Britain December 18, 1953

2 Claims. (Cl. 236—12)

This invention has reference to a device for mixing two streams of fluid at different temperatures, for example a stream of cold water and a stream of hot water or steam, to provide a mixture having a predetermined temperature. Devices of this kind are well known and each includes a flow control valve to and through which both fluid streams are fed, the said valve being adapted to select the relative proportions of the two fluids in the final mixture and being operable by a thermally sensitive unit which is influenced by the temperature of the mixture so that, should the said temperature depart from its predetermined value, the unit actuates the valve to vary the said relative proportions and restore the mixture to the predetermined temperature.

The principal object of the present invention is to provide a new or improved construction of mixing device of the above mentioned kind, which is capable of giving a close control of the mixture temperature even when the device is operating well below maximum flow capacity under which conditions such close control is difficult to obtain.

Another object of the invention is to enable the valve to be dismantled from, for servicing and similar purposes, and reassembled in the device quickly and easily.

A further object of the invention is to prevent the thermally sensitive unit from damage during the dismantling and reassembly of the valve.

Still another object of the invention is to ensure that when the valve is being reassembled in the device, it cannot be fitted incorrectly so that the dismantling and reassembly may be effected by unskilled persons.

Yet another object of the invention is to ensure that during the above-mentioned dismantling and reassembling operations, the setting of the thermally sensitive unit is not disturbed inadvertently.

Yet another object of the invention is to enable the component parts of the body of the device in which the valve and thermally sensitive unit are housed, to be produced as metal die-castings of minimum overall dimensions thereby minimising the number of machine operations involved in the production of the device, with consequent reductions in manufacturing costs.

These and other objects of the invention will appear in the following specification in which the preferred form of the invention is described with reference to the accompanying drawings.

In the drawings, similar reference characters refer to similar parts in all the views of which:

Figure 6 is an exploded view showing, in perspective or elevation, the separable assemblies or units of the device.

Figure 4:
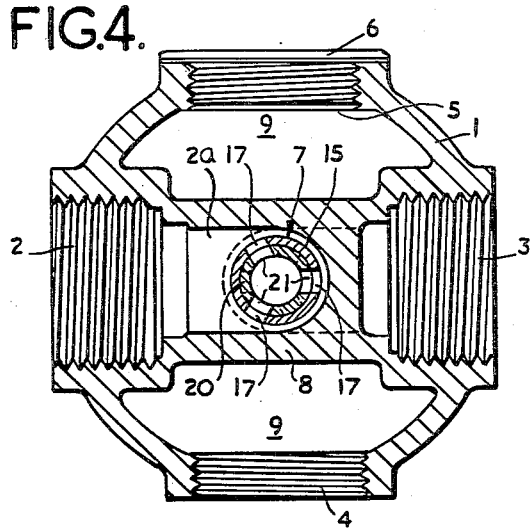
Figure 5:
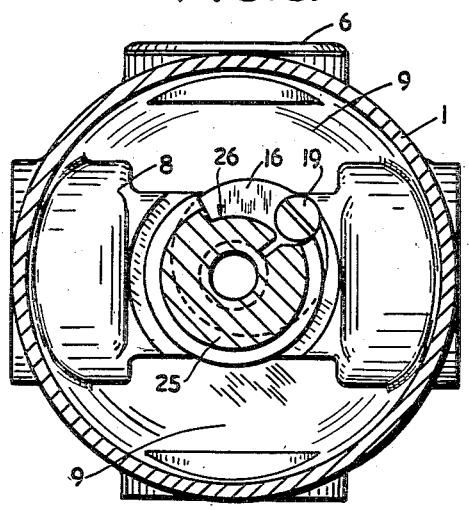

As shown in the said drawings, a device for mixing a stream of cold water with a stream of hot water or steam to provide a mixture at a preselected temperature, comprises a cup-shaped base 1, which is formed with two co-axial and diametrically opposed inlets 2 and 3, and with two co-axial and diametrically opposed mixture discharge outlets 4 and 5, the axis of the inlets being located at right angles to the axis of the outlets. The inlets and outlets are tapped so that a cold water supply pipe may be connected into the inlet 2, a hot water or steam supply pipe may be connected into the inlet 3, a mixture discharge pipe may be connected into either of the outlets 4 or 5, and a closure plug 6 (see Figs. 4 and 5) may be connected into the other outlet.

An extension 2a is formed at and opens from the upper part of the inner end of the inlet 2 and a similar extension 3a is formed at and opens from the lower part of the inner end of the inlet 3; each of the said extensions is of a length and width such that it projects beyond and to opposite sides of a cylindrical well 7 formed in a ridge 8 and concentrically of the base 1, the well opening to the crown of the said ridge which is located below the mouth of the base 1. The extensions are spaced apart axially of the well and are arranged in overlapping relationship, whereas the ridge 8 extends transversely of the interior of the base to divide the said interior into two pockets or recesses 9 from which the discharge outlets open.

The rim of an internally-dished cover 10 seats upon the rim of the base 1 and a washer 11 is interposed between the said rims to provide a fluid-tight joint; the cover is formed with an external peripheral shoulder 12 and the mouth of the base is screw-threaded externally thereof to enable a locking ring 13 having an internal peripheral lip 14, to be screwed on to the base with the said lip abutting the shoulder 12, thereby clamping the cover to the base.

A cylindrical tubular liner 15 makes a close and fluid-tight fit within, and extends lengthwise of, the well 7, the said liner being provided with an eccentric peripheral collar 16 at its upper end, and with two axially-spaced systems of radial ports 17 and 18. The collar seats upon the crown of the ridge 8 and is formed with a hole which registers with a tapped hole in the said crown, a bolt 19 being passed through the flange hole and being screwed into the crown hole; hence, the bolt is adapted to secure the liner in only one predetermined position within the well, in which position the port systems 17, 18 establish communication between the interior of the liner and the inlet extensions 2a and 3a respectively. The head of the bolt stands proud of the collar, as shown in Figure 6.

A cylindrical sleeve 20 which makes a rotatable but fluid-tight fit within the liner, is also provided with two-axially-spaced systems of ports 21, 22 which are in transverse alignment respectively with the liner port systems 17, 18. Each port system consists of three ports which are spaced equidistantly apart around the liner or sleeve, as the case may be; each port 17 is in axial alignment with a corresponding port 18 whereas each port 21 is located between two ports 22 so that when the sleeve is positioned with the ports 21 in register with the ports 17, the ports 22 are totally out-of-register with the ports 18 whereas, by rotation of the sleeve, the ports 21 are moved gradually out of register with the ports 17 whilst the ports 22 are moved into register with the ports 18 until, when the ports 22 are in register with the ports 18, the ports 21 are totally out of register with the ports 17. Since the inlet extensions 2a, 3a extend beyond and to opposite sides of the well 7, fluid supplied to the said extensions is able to flow around the external periphery of the liner and therefore, to have access to all the ports 17 and 18.

The sleeve 20 projects from the linear above the crown of the ridge and is formed at its upper end with a cylindrical head 23 which is of a diameter greater than the diameter of the well and is located within the chamber 24 formed between the crown of the ridge and the internal surface of the cover. A peripheral flange 25 is formed around the end of the head adjacent the ridge and an arcuate recess 26 (see Fig. 5) which is engaged by the head of the bolt 19, is formed in the said flange; the circumferential dimension of the recess is such that when the sleeve is rotated from one extreme position in which one end of the recess is in abutment with the bolt head, to an opposite extreme position wherein the other end of the recess is in contact with the bolt head, the ports 21 or 22 are taken from the position wherein they are in register, to the position wherein they are totally out of register, with the ports 17 or 18, depending on the direction of rotation.

Due to this rotational movement of the sleeve, then, when the inlets 2 and 3 are connected respectively to a supply of cold water and hot water (or steam), the flow of cold water or hot water (or steam) may be cut off or the relative proportions of the said fluids flowing through the systems of ports may be varied within fine limits.

To impart the said rotational movement to the sleeve, the inner end of a spirally-wound coil of bimetal strip 27 is anchored to the periphery of the sleeve head 23, the coil being disposed transversely of the chamber 24, and wholly below the upper face of the said head. A plurality of inclined passages 28 extend from the bore of the sleeve 20 to and adjacent the periphery of the upper face of the head so that any fluid which is fed into the sleeve through the systems of ports 17 and 21 and/or 18 and 22, is constrained to flow through the said passages and into the chamber 24 upwardly of the bimetallic coil. Therefore, since the discharge outlets 4 and 5 are located below the coil, the said fluid must flow between the turns of the coil before being discharged from the device through the unplugged outlet 4.

The outer end of the strip 27 is secured to a radial arm 29 extending from a spindle 30 which is journalled in and co-axially of the cover 10, the said spindle projecting through and beyond the cover and its outer end being of frustro-conical shape and engaging a correspondingly-shaped hole formed in the hub of a handle 31. The inner end of the spindle is formed with a blind axial bore 32 which sockets on to a stud 33 extending from and co-axially of the face of the head 23 to which the inclined passages 28 open. The spindle is anchored to the stud by a split ring 34 which engages registering grooves in the stud and the blind bore thereby permitting relative rotational movement but preventing relative axial movement, between the spindle and sleeve. A rubber or equivalent resilient ring 35 inserted in a groove in the spindle, prevents fluid from escaping between the spindle and cover.

The handle 31 is detachably assembled to the outer end of the spindle by a bolt 36 of which the shank is screwed into a blind tapped hole 37 in the said spindle and of which the head overhangs and seats upon the upper face of the handle hub around the frustro-conical hole therein. Hence, by screwing the bolt 36 further into the blind hole 37, the handle hub is forced on to and is prevented from rotation relatively to, the spindle. A coil spring 38 is compressed between the cover 10 and the crown of an annular recess 39 formed in the underside of the handle hub.

Figure 1:
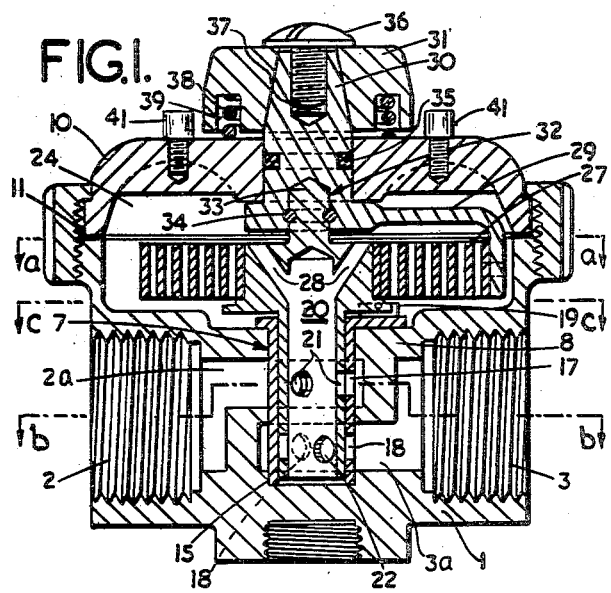
Figure 1 is a sectional elevation of and Figure 2 is a plan of the fluid mixing device.
Figure 2:
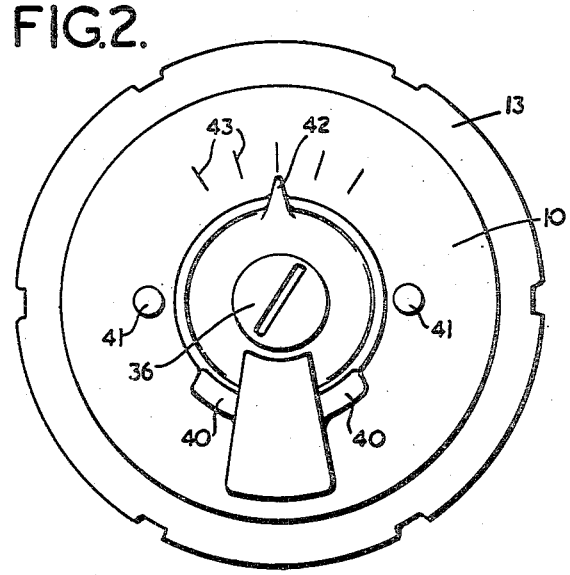
Figure 3:
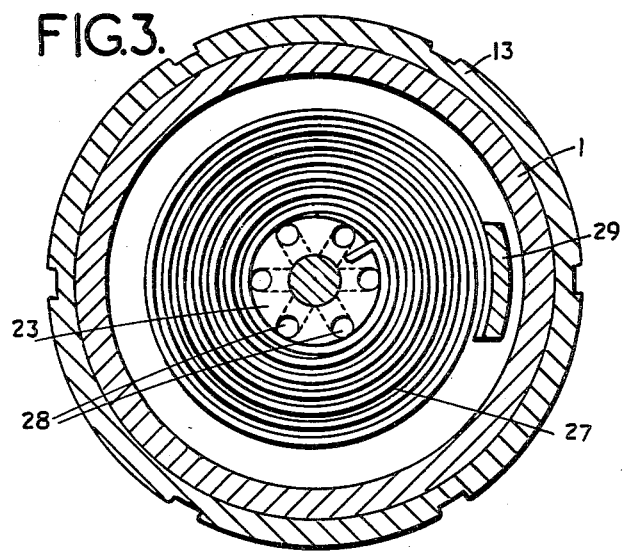
Figures 3, 4 and 5 are sections taken along the lines a—a, b—b and c—c respectively, of Figure 1.

As shown in Figure 2, bosses 40 formed on opposite sides of the handle are adapted to co-operate with pegs 41 fixed in the outside of the cover 10, for limiting the rotational movement that may be imparted to the spindle by actuation of the handle. A pointer 42 provided on the handle hub adjacent graduations 43 on the cover, gives a readily visible indication of the spindle setting.

As the two streams of cold water and hot water (or steam) are fed to the inlets 2 and 3, they pass through the extension 2a and 3a into the interior of the sleeve 20 in relative proportions determined by the extents to which the ports 17 and 18 register with the ports 21 and 22 respectively, that is to say, by the rotational setting of the said sleeve relatively to the fixed liner 15. As the fluid streams enter the bore of the sleeve they are mixed together and the resulting single stream of mixture flows through the inclined passages 28 into the chamber 24, then downwardly between the turns of the coil 27 into one of the recesses 9 from which the said mixture is discharged through the outlet.

The rotational setting of the sleeve and therefore the temperature of the fluid mixture is selected initially by turning the handle 31 about the axis of the spindle 30, the movement being transmitted through the said spindle, the radial arm 29, and bimetallic coil 27 to the sleeve.

Should the mixture depart from the selected temperature for any reason, the temperature of the coil is altered accordingly and thereby imparts a rotational movement to the sleeve which varies the relative proportions of the hot and cold fluids in the mixture to re-establish the desired temperature.

Should it be desired to dismantle the device for servicing or any other reason, it is only necessary to unscrew the locking ring 13 from the body 1, whereupon the cover 10 may be lifted and the connection between the spindle 30 and stud 33, causes the sleeve to be withdrawn from the liner without imposing any strain upon the coil 27 or disturbing the setting of the spindle, coil and sleeve relatively to the cover. The removal of the cover, coil and sleeve assembly or unit exposes the head of the bolt 19 which may therefore be removed to permit withdrawal of the liner 15 from the well 17; since, when the original or a replacement liner is inserted into the well, it is only possible to secure it in position by inserting the bolt 19 into the two registering holes, then obviously, the liner cannot be resecured in the base in an incorrect position. Further since the arcuate recess 26 must engage the bolt head before it is possible to assemble the original or a replacement spindle, coil and sleeve unit to the base, such engagement ensures that the said unit is assembled approximately in its desired position wherein the sleeve ports are correctly located relatively to the liner ports; this correct position may be obtained exactly by turning the cover 10 until, for example, the two pegs 41 are located in the plane of the axis of the inlets 2, 3. Therefore, the dismantling and re-assembly of the device may be effected quickly and easily, even by an unskilled person.

The arrangement of the inlets 2, 3, inlet extensions 2a, 3a, well 7 and outlets 5, 6, provides a base construction which is eminently suitable for production by a die-casting operation, thereby reducing production costs since subsequent machining operations are reduced to a minimum. Likewise, the cover 10 may be produced by a die-casting operation.

The foregoing description and the accompanying drawings disclose the preferred embodiment of the invention but it is to be understood that this disclosure is merely illustrative and that various changes in construction details may be made as are fairly within the scope of the following claims; for example, the number of ports in each of the port systems 17, 18, 21 and 22 and the number of inclined passages in the sleeve head 23 may be varied; also any suitable means other than the ring 13 may be provided for locking the cover 10 to the base 1, any suitable means alternative to the split ring 34 may be adapted for connecting the stud 33 to the spindle 30 so as to permit relative rotation but prevent relative axial displacement, and any means alternative to the resilient ring may be provided for preventing seepage of fluid between the said spindle and cover.

Having thus described my invention, what I claim is:

1. In a mixing device comprising a body having an internal chamber, two fluid inlets, at least one mixture outlet, and a co-axial well with which the said inlets communicate at different axially-spaced positions of the said well, and of which one end opens into the said chamber, the provision of a liner within the well, the said liner having two axially spaced systems of ports which establish communication respectively between the interior of the well and the said inlets, and an eccentric peripheral collar around its end opening to the chamber, which collar seats upon a ridge extending transversely of the chamber and having the well formed therein, a single bolt extending through the said collar into engagement with the ridge for fixing the liner in the well, a sleeve rotatably accommodated within the said liner and having two axially-spaced systems of ports which are located respectively at the levels of the two liner port systems, the said sleeve projecting from the liner and beyond the collar into the said chamber and being formed on its projecting end with a head of greater area than the said well, the said head being formed with a plurality of relatively inclined passages which extend between the bore of the sleeve and open to the end face of the head remote from the said sleeve at positions adjacent the periphery of the head, and with a recess in its end face adjacent the said sleeve which recess is engaged by the head of the said bolt, a coiled bi-metallic strip disposed around and secured by its inner end to the periphery of the head and by its outer end to a radial arm integral with a spindle journalled in the device in axial alignment with the sleeve, the said mixture outlet being formed in the body on the same side of the said strip as the well.

2. In a fluid mixing device comprising a body having an internal chamber, two fluid inlets, at least one mixture outlet and a co-axial well with which the said inlets communicate at different axially-spaced positions of the said well, and of which one end opens into the said chamber, the provision of a fixed hollow liner within the well, the said liner having two axially spaced systems of ports which establish communication respectively between the interior of the well and the said inlets, a sleeve rotatably accommodated within the said liner and having two axially-spaced systems of ports which are located respectively at the levels of the two liner port systems, the said sleeve projecting from the liner into the said chamber and being formed on its projecting end with a head of greater area than the said well, the said head being formed with a plurality of passages which communicate with the bore of the sleeve and open to the face of the head remote from the said sleeve, the said passages being in diverging relationship having their axes along the mantle of an inverted cone so that they open to the said face adjacent the periphery of the head, a coiled bimetal strip disposed around the said head having one end anchored to the said periphery and its opposite end anchored to a radial arm integral with a spindle which is journalled in the device in axial alignment with the sleeve, the said mixture outlet being formed in the body on the opposite side of said strip to the said head face, said body having a cover disposed above said coiled bimetal strip, said spindle being journalled in the cover in co-axial alignment with the sleeve, a co-axial stud on the sleeve head engaging a blind axial bore in the spindle, and means attaching the stud to the bore interior for relative rotation but restraining relative axial movement between the spindle and sleeve.

References Cited in the file of this patent
UNITED STATES PATENTS

| 1,611,650 | Lawler | Dec. 21, 1926 |
| 2,302,256 | Rietzel | Nov. 17, 1942 |
| 2,603,420 | Tacchi | July 15, 1952 |

FOREIGN PATENTS

| 514,326 | Great Britain | Nov. 6, 1939 |